March 21, 1933.            J. A. ADELL            1,901,943
                           JUNCTION BOX
                         Filed May 9, 1927
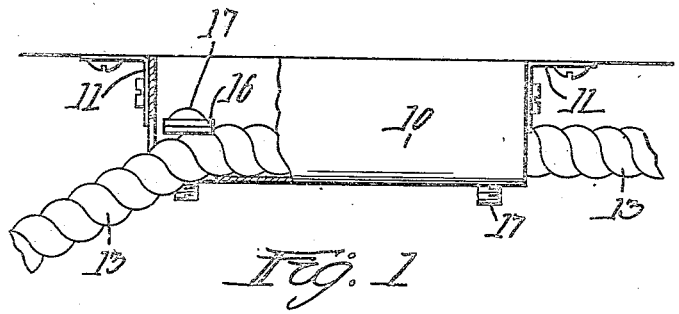
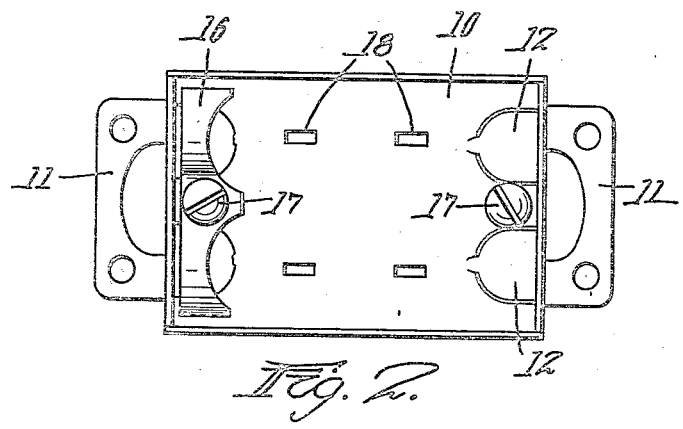
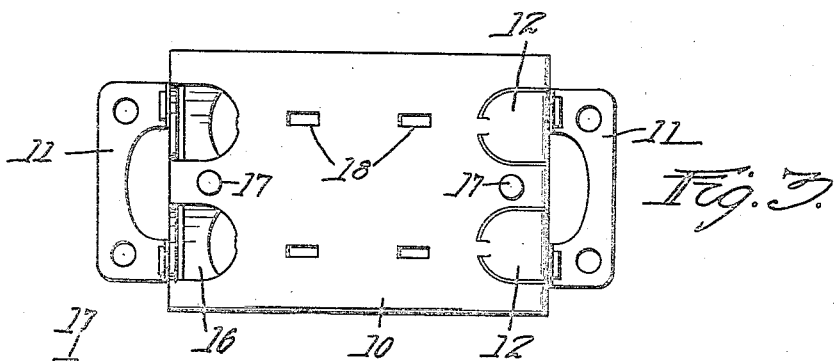
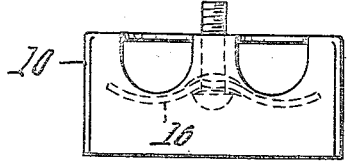
Inventor
John A. Adell
By Attorneys Patented Mar. 21, 1933

1,901,943

UNITED STATES PATENT OFFICE

JOHN A. ADELL, OF ORANGE, MASSACHUSETTS

JUNCTION BOX

Application filed May 9, 1927. Serial No. 189,794.

This invention relates to a junction box of a well known type which ordinarily is made of sheet metal. Such a box has a series of knock-outs which are a part of the sheet metal from which the box is made and attached to it by integral tongues and cut through all the rest of the way around their periphery. The boxes are sold with all these knock-outs in place. Those through which a cable is to be passed are knocked out when used. Heretofore these knock-outs were flat circular pieces located in the bottom or ends of the box and it has been difficult to get the cables through them and fasten them inside in some instances.

The object of this invention is to provide a form of a knock-out which will be suitable for receiving the cable coming into the box at an angle. The invention also involves the location of the double fastening means inside in proper relation to these knock-outs so that the cable will be positively held against the edge of each knock-out.

Reference is to be had to the accompanying drawing in which

Fig. 1 is a side view of a junction box constructed in accordance with this invention with a part of the wall broken away to show one way in which the cable can enter and be fastened therein;

Fig. 2 is a plan of the same showing one fastening means in position and with the other removed so that the knockouts are more readily visible;

Fig. 3 is a bottom plan view of the box showing two of the knock-outs removed and the other two in position; and Fig. 4 is an end view with the supporting brackets removed.

The invention is shown as applied to a junction box 10 which, aside from the features of this invention, is of a well known type. The box is made of a single piece of sheet metal bent up into a box-like form with an open top. The ends are provided with brackets 11 secured thereto in the ordinary way and adapted to be secured to a wall or ceiling as indicated in Fig. 1.

In accordance with this invention a series of knock-outs 12 are provided, each one extending into the end wall and the bottom wall of the box. In other words each knock-out is made in two planes and each knock-out itself, instead of being flat, is bent at right angles approximately at its center. Instead of being circular, they are oblong in shape and L-shaped in side view. When one of these knock-outs is removed it provides an opening at the bottom and end wall extending into both for receiving the cable 13 which may enter at an angle as shown in Fig. 1. When the cable is in this position it has to be distorted with the old form of junction box having the knock-outs entirely in the bottom or ends. It is difficult also to clamp it in position properly inside the box.

With the present device I provide clamping means in the old form of a double bowed bar 16 secured in position by a single screw 17 passing through the bottom of the box. In this case I locate these clamps at the ends of the box right over the part of the knock-out that is located in the bottom thereof. These clamps have one side straight where they engage one end of the box and are concave on the bottom to partially fit and securely hold the cable.

From the construction shown in the drawing it will be seen that the cables can be brought into the box in an angular direction and that they are held firmly by the clamps 16 at a point adjacent to the point of entrance. The clamp holds the cable against the edge wall of the hole where the knock-out is removed. It is to be understood that the box is provided with the usual attachments inside, which are not shown, but the positions of which are indicated by perforations 18 through the bottom of the box.

Although I have illustrated and described only a single form of the invention I am aware of the fact that modifications can be made therein by any person skilled in the art without departing from the scope of the invention as expressed in the claims. Therefore, I do not wish to be limited to the details of construction herein disclosed, but what I do claim is:

1. In a sheet metal junction box, the combination with an integral bottom and end walls and a removable L-shaped knock-out extending about half way into both the end wall and the bottom of the box, of a fastening device for the cable inside the box located against the end of the box for gripping the cable against the inner edge of the hole in the bottom of the box from which the knock-out is removed.

2. An outlet receptacle comprising, in combination, two adjacent walls in angular relationship with each other, a cable entrance disposed partly in one of said walls and partly in the other of said walls, a clamping member within said receptacle, said cable entrance and said clamping member being so related that said cable entering said receptacle through the cable entrance from positions parallel to either of said walls must be bent at the region of entry into said receptacle.

3. In combination, an outlet receptacle, a cable entering said receptacle, said receptacle comprising two adjacent walls in angular relationship with each other, said walls having a cable entrance disposed partly in one of said walls and partly in the other of said walls, and a clamping member within said receptacle, said cable entrance and said clamping member being so related that said cable entering said receptacle through said cable entrance from positions parallel to either of said walls must be bent at the region of entry into said receptacle.

In testimony whereof I have hereunto affixed my signature.

JOHN A. ADELL.